UNITED STATES PATENT OFFICE.

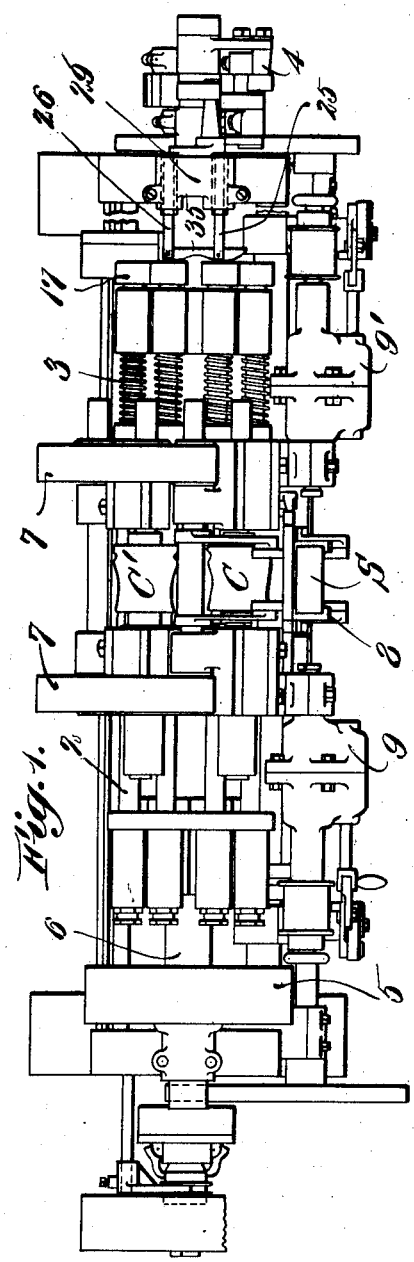

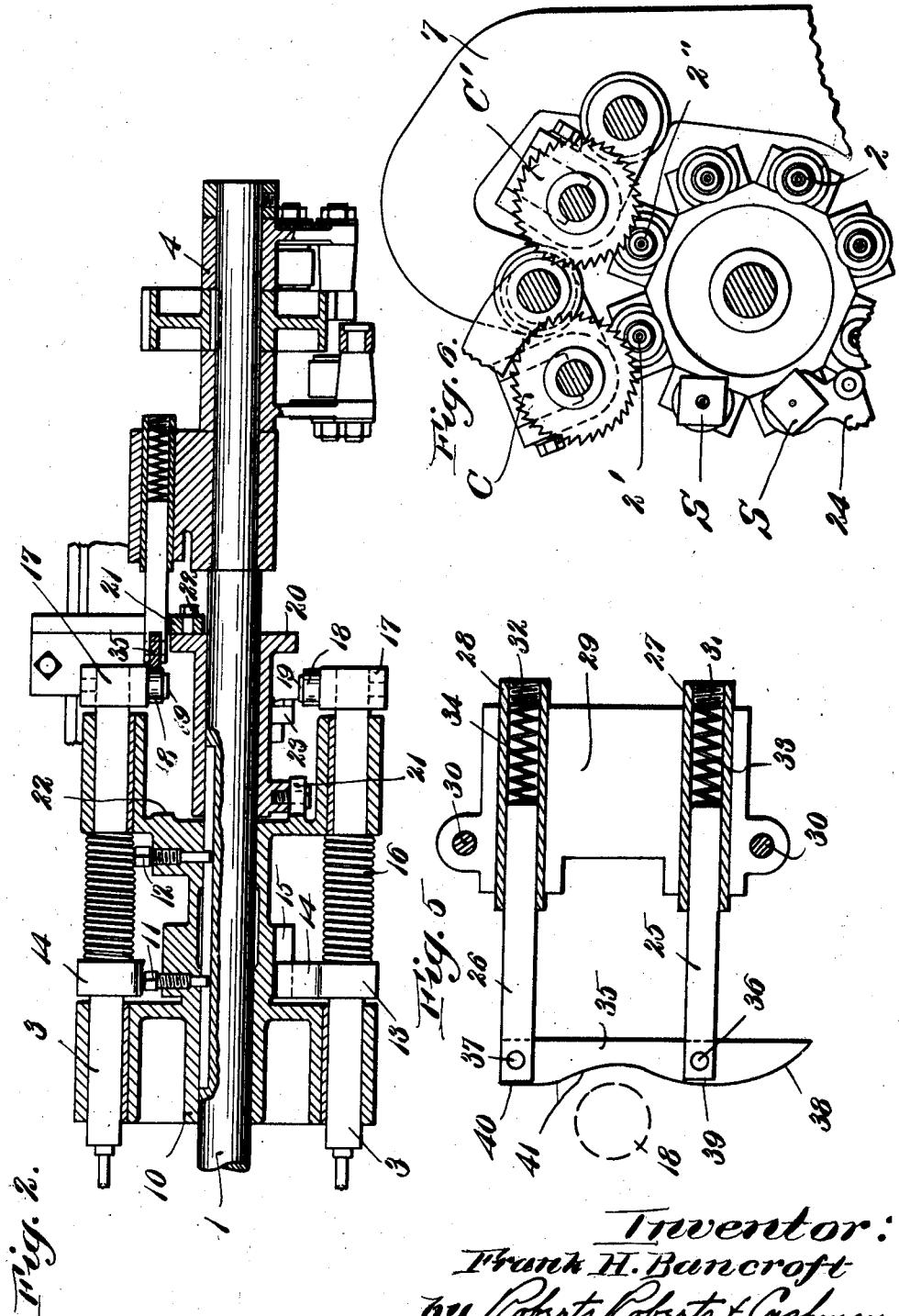

FRANK H. BANCROFT, OF GARDNER, MASSACHUSETTS, ASSIGNOR TO P. DERBY & COMPANY, OF GARDNER, MASSACHUSETTS, A CORPORATION OF MASSACHUSETTS.

AUTOMATIC TURNING-MACHINE.

1,338,275.

Specification of Letters Patent. Patented Apr. 27, 1920.

Application filed October 21, 1918. Serial No. 259,102.

*To all whom it may concern:*

Be it known that I, FRANK H. BANCROFT, a citizen of the United States of America, and resident of Gardner, in the county of Worcester and State of Massachusetts, have invented new and useful Improvements in Automatic Turning-Machines, of which the following is a specification.

This invention relates to turning machines and more particularly to wood turning machines of the type described in my prior application, Serial No. 119,145, filed September 8, 1916, for improvements in automatic turning machines.

The machine described in the aforesaid application comprises a rotatable carrier carrying a circular row of opposed head and tail spindles, the carrier being mounted to rotate about an axis concentric with the circular row of spindles, means to rotate the carrier about its axis and to rotate the respective head spindles about their respective axes, mechanism to feed stock to the pairs of spindles at one position in their path of revolution about the axis of the carrier, a plurality of cutters adjacent the said path of revolution adapted successively to act upon the stock as the carrier brings the stock into operative relation thereto, and means to deliver the turned articles from the machine.

The object of the present invention is to provide means for forcing the spindles into the stock supplied to the machine and for yieldingly holding the spindles in the stock during the periods that the cutters are operating on the stock, to provide a plurality of means for holding the spindles in the stock during the respective periods that the several cutters are successively acting upon the stock, to correlate the respective holding means so that they coöperate together and function in conjunction, and generally to improve the operation of the spindles in a machine of the character referred to.

In the accompanying drawings:

Figure 1 is a plan view of a turning machine comprising the preferred embodiment of the present invention;

Fig. 2 is a vertical longitudinal sectional view of a portion of the revolving carrier, showing the relationship between the tail spindles and my improved means for advancing the spindles and holding the spindles in the stock during the cutting operation;

Fig. 3 is an enlarged elevational detail view of my improved mechanism showing a portion of a tail spindle coming into operative relationship therewith;

Fig. 4 is a similar view showing the ends of two tail spindles in the position in which the stock carried thereby is being acted upon by the respective cutters;

Fig. 5 is a similar view showing the position of a tail spindle cam when the tail spindle is in a position intermediate the two cutting positions; and Fig. 6 is a vertical transverse central section of the spindle carrier and cutters.

The machine illustrated in elevation in Fig. 1, which is similar to that disclosed in my aforesaid application, comprises in general a rotary carrier mounted to rotate about the axis of the shaft 1 and carrying a plurality of opposed head spindles 2 and tail spindles 3, ratchet and pawl mechanism 4 for stepping the carrier around, a pulley 5 for transmitting power to the shaft 6 to which the head spindles 2 are geared to rotate the stock, frame members 7 upon which the cutters C and C' are mounted adjacent the path of revolution of the stock held between the head and tail spindles, a magazine 8 for feeding pieces of stock S to the machine and two boring tools 9 and 9' for boring the ends of the stock while in the magazine to receive the head and tail spindles.

The tail spindle portion of the carrier shown in Fig. 2 comprises a sleeve 10 keyed to the shaft 1 by means of screws 11 and 12, to prevent rotary but not longitudinal movement thereon, the tail spindles 3 being mounted in alined openings in the sleeve 10 and being slidable longitudinally in the openings. Around each tail spindle is provided a collar 13 having an extension 14 extending into a slot 15 in the sleeve 10 to prevent the tail spindle from rotating. Compression springs 16 are disposed between the collars 13 and the right-hand end of the sleeve 10 normally to urge the tail spindles into forward stock-engaging position. On the rear ends of the tail spindles 3 are mounted collars 17 upon the inner side of which rollers 18 are rotatably mounted by means of screws 19. Surrounding the shaft 1 at the right hand end (Fig. 2) of the sleeve 10 is a portion 20 rigidly connected to the frame of the machine by means of a member 21 and screw 22. The sleeve 20 carries a roller 21' adapted to engage a raised annular bearing surface 22' to counteract the rearward thrust on the tail spindle support while the stock is being turned. The sleeve 20 also carries a cam 23 arranged to engage the rollers 18 on the left-hand side to retract the spindles, the cam 23 being so positioned along the path of revolution of the tail spindles as to retract the tail spindles momentarily at the delivering position of the carrier to permit the turned articles to be dropped from the spindles. As each tail spindle moves past the cam 23 a new piece of stock is brought by the feeding means, a portion of which is shown at 24 in Fig. 6, into position to be picked up by the tail spindle and the corresponding head spindle so that when the roller 18 leaves the cam 23 the spring 16 plunges the tail spindle forwardly into engagement with the stock so that the stock is picked up by the tail spindle and corresponding head spindle.

While the springs 16 advance the tail spindles against the stock with sufficient force to pick up the stock from the feeding mechanism it is impracticable to make the springs sufficiently strong to force the head spindle into the stock a sufficient distance to afford an adequate hold on the stock to rotate the stock while being turned. I therefore arrange the mechanism shown in detail in Figs. 3, 4, and 5, to force the spindles into the stock more deeply before the stock comes into operative relationship to the cutters.

The mechanism illustrated in detail in Figs. 3, 4 and 5 comprises plungers 25 and 26 arranged to reciprocate in sleeves 27 and 28 mounted in the portion 29 of the frame of the machine. The frame 29 is divided horizontally in the plane of the axes of the sleeves 27 and 28 and the two parts of the frame are held together by means of bolts 30. Thus the sleeves 27 and 28 may be longitudinally adjusted by loosening the screws 30. In the rear ends of the sleeves 27 and 28 are provided plugs 31 and 32 and extending between these plugs and the rear ends of the plungers 25 and 26 are compression springs 33 and 34. Pivotally associated with the forward ends of the plungers 25 and 26 is a cam member 35, the member 35 being disposed in slots in the ends of the plungers 25 and 26 and preferably being connected to the plungers by means of pins 36 and 37.

The cam member 35 is provided with an inclined cam surface 38 at its forward end and with portions of maximum protuberance 39 and 40 in the regions of the plungers 25 and 26. The central portion 41 of the cam member 35 is preferably recessed intermediate the plungers for a purpose which will hereinafter appear.

As shown in Fig. 6 one pair of spindles presents a piece of stock to one of the cutters while another pair of the spindles presents another piece of stock to the other of the cutters, the cutters being spaced apart an angular distance equal to the angular distance between adjacent pairs of spindles. Thus in Fig. 6 the spindles 2' present a piece of stock to the cutter C at the same time that the spindles 2'' present a piece of stock to the cutter C', it being understood that each piece of stock is first presented to the cutter C which is preferably a roughing cutter and subsequently to the cutter C' which is preferably a finishing cutter. The plungers 25 and 26 are disposed approximately in alinement with the respective pairs of spindles in the positions 2' and 2'' in Fig. 6, that is, in the positions in which the cutters C and C' are operating upon the stock carried by the spindles.

As a tail spindle approaches the region of the first cutter C the roller 18 carried thereby comes into contact with the inclined surface 38 or the cam 35 as indicated in Fig. 3. The springs 33 and 34 are sufficiently stiff to hold the cam member 35 substantially in fixed position under normal conditions so that the inclined surface 38 forces the tail spindle forwardly as the roller 18 rides up the inclined surface, thereby forcing the stock against the head spindle with sufficient force to embed the head spindle in the stock. When the tail spindle comes into the radial plane of the plunger 25 the cutter C gives the stock a roughing cut and the plunger 25 acting through the protuberance 39 on cam 35 yieldingly holds the tail spindle advanced a sufficient distance to prevent the stock from jumping out of the spindles under normal conditions. Should the stock contain a knot, or be improperly seated in the spindles, or for any other reason have a strong tendency to jump out, the plunger 25 will be forced back against the action of the spring 33 and permit the stock to be discharged from the spindles thereby preventing injury to the cutters or to the spindles. After the stock leaves the first cutter C there is practically no tendency for the tail spindle to retract and the spring 16 is thus adequate to hold the spindle in advanced position. However, as the stock comes into contact with the cutter C' there is again a tendency for the stock to jump out of the spindles and to counteract this tendency the plunger 26 acting through the protuberance 40 on the cam 35 yieldingly holds the tail spindle in advanced position as above described in connection with plunger 25.

By pivotally connecting the cam 35 to each of the plungers 25 and 26 the cam 35 is prevented from rotating about the pivot 36 when a roller 18 strikes the inclined surface 38 inasmuch as any tendency for the cam 35 to rotate about pin 36 is counteracted by the upper end (Figs. 3, 4 and 5) of the cam engaging the roller of the next preceding tail spindle. Thus my improved mechanism serves to advance the spindles into the stock and yieldingly to hold the spindles in the stock during the periods that the cutters are operating on the stock. Owing to the yieldingness of the plungers any abnormal tendency for the spindles to separate is permitted by the springs 33 and 34 being compressed, thereby preventing injury to the machine. By making the sleeves 27 and 28 adjustable in the frame the apparatus may be adjusted for different lengths of stock by adjusting the sleeves in the frame and adjusting the sleeves 10 carrying the tail spindles longitudinally of the shaft 1. By connecting the cam 35 to both plungers the cam is substantially braced.

The pressure exerted by springs 33 and 34 may be of the order of 150 pounds per square inch for small turned articles such as tent pins and the like. By adjusting the plugs 31 and 32 along the sleeves 27 and 28 the pressure of the springs may be regulated.

I claim:

1. In a turning machine comprising a carrier, a plurality of opposed head and tail spindles arranged in a circular row on said carrier, means for rotating said carrier about an axis concentric with said circular row of spindles and for rotating the pieces of stock about the respective spindle axes, the combination with one set of spindles of a spring plunger for forcing the spindles into pieces of stock, the spring plunger being mounted approximately in alinement with one position of the spindles and being arranged yieldingly to engage the spindles for a limited period after stock has been supplied to the spindles to force the spindles into the stock.

2. In a turning machine comprising a carrier, a plurality of opposed head and tail spindles arranged in a circular row on said carrier, means for rotating said carrier about an axis concentric with said circular row of spindles and for rotating the pieces of stock about the respective spindle axes, the combination with the spindles of a spring plunger for forcing the spindles into pieces of stock, the spring plunger being mounted adjacent the circular path of said spindles substantially parallel with the spindles and being provided with a cam adapted to engage cams on the spindles yieldingly to force the spindles into stock supplied to the machines.

3. In a turning machine comprising a carrier, a plurality of opposed head and tail spindles arranged in a circular row on said carrier, means for rotating said carrier about an axis concentric with said circular row of spindles and for rotating the pieces of stock about the respective spindle axes, the combination with the spindles of spring means for forcing the spindles into pieces of stock, the spring means being mounted adjacent the circular path of said spindles and being provided with a cam adapted to engage cams on the spindles to force the spindles into the stock, the spring means being so disposed with relation to the turning means as yieldingly to hold the spindles in the stock while the stock is being turned.

4. In a turning machine, comprising a carrier, a plurality of opposed head and tail spindles arranged in a circular row on said carrier, means for rotating said carrier about an axis concentric with said circular row of spindles and for rotating the pieces of stock about the respective spindle axes, means for supplying stock to said spindles, and a plurality of cutters arranged to act successively upon the stock at adjacent regions in the path of revolution of the stock about the axis of the carrier, the combination with said spindles of a plurality of spring means mounted adjacent the circular path of said spindles and arranged to engage the spindles while the stock is being acted upon by the cutters, thereby yieldingly to hold the spindles in the stock during the periods that the stock is being acted upon by the cutters.

5. In a turning machine, comprising a carrier, a plurality of opposed head and tail spindles arranged in a circular row on said carrier, means for rotating said carrier about an axis concentric with said circular row of spindles and for rotating the pieces of stock about the respective spindle axes, means for supplying stock to said spindles, and a plurality of cutters arranged to act successively upon the stock at adjacent regions in the path of revolution of the stock about the axis of the carrier, the combination with said spindles of a plurality of spring plungers mounted adjacent the circular path of said spindles in the said regions of the cutters respectively, and an elongate cam pivotally associated with the ends of said spring plungers, said cam being arranged to engage the spindles as they approach the region of the cutters to force the spindles into the pieces of stock supplied thereto and being arranged yieldingly to hold the spindles in the stock while the stock is being acted upon by the cutters.

6. In a turning machine, comprising a carrier, a plurality of opposed head and tail spindles arranged in a circular row on said carrier, means for rotating said carrier about an axis concentric with said circular row of spindles and for rotating the pieces of stock about the respective spindle axes, means for supplying stock to said spindles, and a plurality of cutters arranged to act successively upon the stock at adjacent regions in the path of revolution of the stock about the axis of the carrier, the combination with said spindles of a plurality of spring plungers mounted adjacent the circular path of said spindles in the said regions of the cutters respectively, and an elongate cam pivotally associated with the ends of said spring plungers, said cam having an inclined face in advance of the first plunger to force the spindles into the stock as they approach the region of the first cutter, and having portions of maximum protuberance in the regions of the plungers to hold the spindles in the stock while the stock is being acted upon by the cutters.

7. In a turning machine, comprising a carrier, a plurality of opposed head and tail spindles arranged in a circular row on said carrier, means for rotating said carrier about an axis concentric with said circular row of spindles and for rotating the pieces of stock about the respective spindle axes, means for supplying stock to said spindles, and a plurality of cutters arranged to act successively upon the stock at adjacent regions in the path of revolution of the stock about the axis of the carrier, the combination with said spindles of a plurality of spring plungers mounted adjacent the circular path of said spindles in the said regions of the cutters respectively, and an elongate cam pivotally associated with the ends of said spring plungers, said cam having an inclined face in advance of the first plunger to force the spindles into the stock as they approach the region of the first cutter, and having a depressed portion between said plungers so that the spindles are normally disengaged from the cam in transit between the spindles.

Signed by me at Gardner, Massachusetts, this eleventh day of October, 1918.

FRANK H. BANCROFT.